United States Patent [19]

Fair

[11] 4,341,181
[45] Jul. 27, 1982

[54] LIVESTOCK CONFINEMENT PASTURE MACHINE

[76] Inventor: Walter R. Fair, P.O. Box 306, Menno, S. Dak. 57045

[21] Appl. No.: 232,010

[22] Filed: Feb. 6, 1981

[51] Int. Cl.³ .............................................. A01K 3/00
[52] U.S. Cl. ..................................... 119/20; 180/131
[58] Field of Search ...................... 119/20, 21; 180/79, 180/131; 318/587

[56] References Cited

U.S. PATENT DOCUMENTS

| | | | |
|---|---|---|---|
| 179,519 | 7/1876 | Cameron | 119/20 |
| 3,302,616 | 2/1967 | Bradshaw | 119/21 |
| 3,395,771 | 8/1968 | Moyer et al. | 180/131 |
| 4,048,959 | 9/1977 | Steele | 119/20 |

Primary Examiner—Hugh R. Chamblee
Attorney, Agent, or Firm—Sixbey, Friedman & Leedom

[57] ABSTRACT

The livestock confinement pasture machine (10) includes a confinement unit (12) for confining livestock within a defined area. A drive assembly (36) is mounted upon the confinement unit (12) for moving the confinement unit (12) at a preset speed. The drive assembly (36) and the direction of movement of the confinement unit (12) are controlled by a steering unit (100) which operates to sense and follow a preformed direction control path (134) for the livestock confinement pasture machine (10). If the confinement unit (12) engages a large obstacle or the steering unit (100) loses the direction control path (134), disengagement units (98, 132) are provided to terminate operation of the drive assembly (36).

10 Claims, 11 Drawing Figures

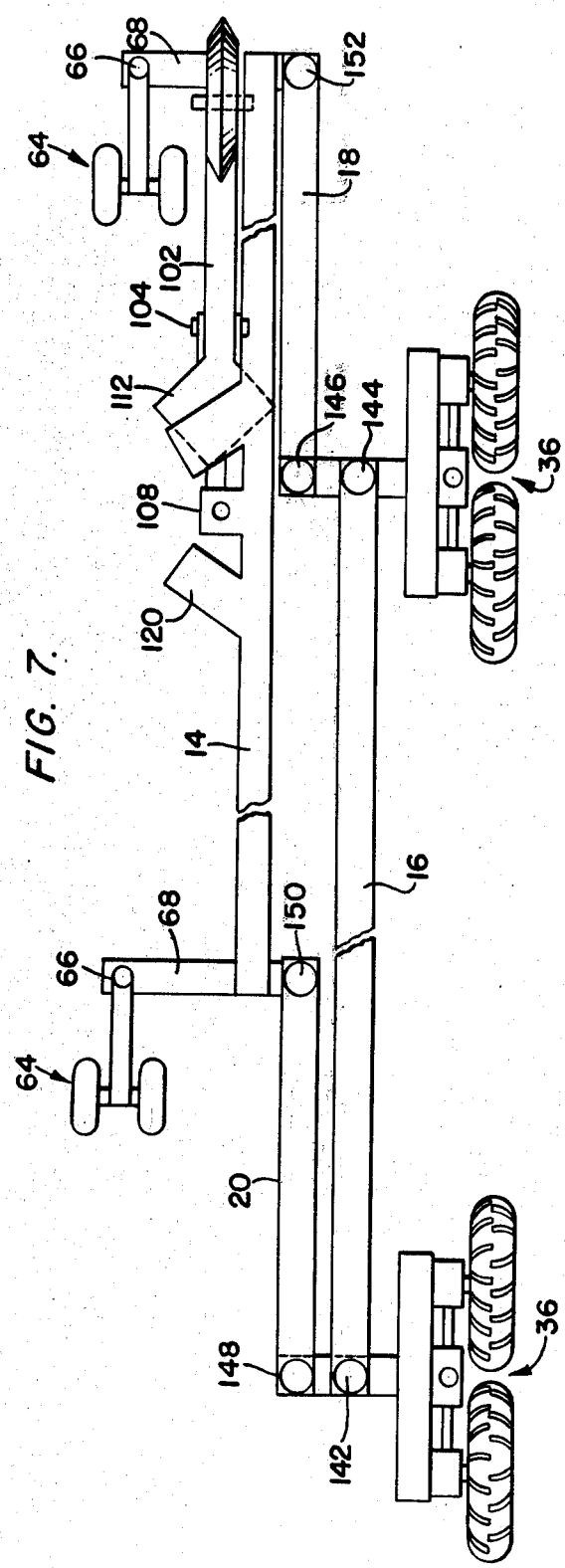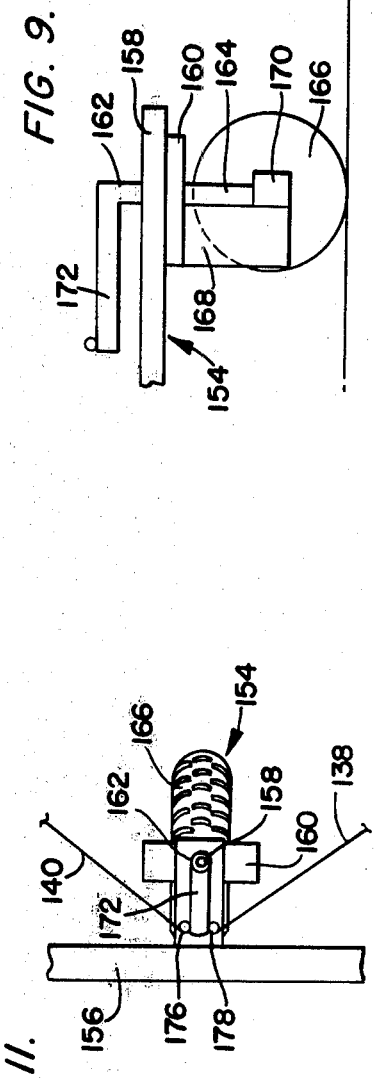

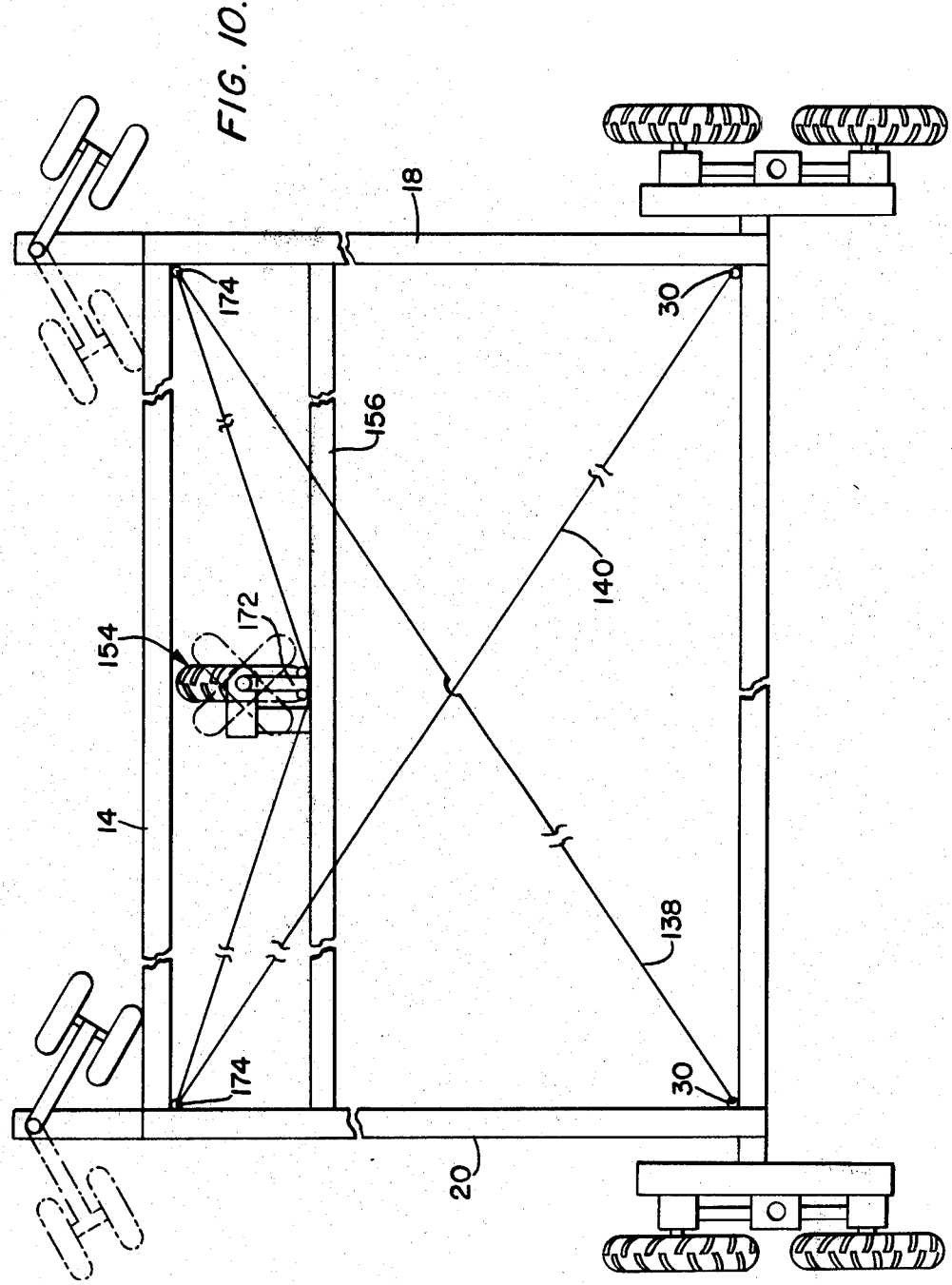

LIVESTOCK CONFINEMENT PASTURE MACHINE

TECHNICAL FIELD

The present invention relates generally to livestock confinement devices and more particularly to an improved livestock confinement pasture machine which automatically moves across a pasture at a predetermined speed to control livestock grazing.

BACKGROUND OF THE INVENTION

Livestock producers and grain farmers are perpetually faced with the problem of trying to salvage downed crops caused by environmental effects such as wind, hail and snow storms. A primary method for accomplishing such salvage is to permit livestock to graze in the areas where crop damage has occurred. This practice, however, results in control problems, for the livestock will often overeat due to the abundance of available food in a very limited area. On the other hand, once out of confinement, the livestock will sometimes fail to gain a maximum amount of weight due to excessive movement in the unconfined pasture area.

In the past, power corrals for livestock have been developed such as that shown in U.S. Pat. No. 4,048,959 to Steel. These corrals are designed primarily to move livestock from one place to another while maintaining the stock in confinement, and no provision is made for controlled grazing by the stock in an area laid out along a defined path.

DISCLOSURE OF THE INVENTION

The present invention is directed to a novel and improved livestock confinement pasture machine which is adapted to confine livestock within a defined area and to cause movement of the livestock in the defined area along a predetermined path.

Another object of the present invention is to provide a novel and improved livestock confinement pasture machine for moving livestock within a confined area across a pasture at a predetermined speed to control the grazing rate of the livestock. The speed of the livestock confinement pasture machine may be preset in accordance with the volume of grazing material available along the defined path of the machine.

A further object of the invention is to provide a livestock confinement pasture machine which incorporates a timed control system to initiate movement of the machine for a predetermined period and to then stop machine movement for a predetermined period before movement is again initiated. This causes the machine to move in steps along a programmed predetermined path and to pause along the path of travel for preset periods of time.

A still further object of the invention is to provide a livestock confinement pasture machine having a confinement unit with pivoted wheels mounted adjacent the front corners thereof and drive wheels mounted adjacent the rear corners thereof. The drive wheels are driven by individual motors on each side of the machine, and these motors are powered by a timer controlled power source. A steering mechanism on the front of the machine is provided to follow a preformed guide path, and limit units on each side of the steering mechanism are contacted thereby to shut down one of the motors and cause the machine to turn. Motor control units are provided to simultaneously shut down both motors when the machine either contact a large obstruction or the steering mechanism leaves the guide path.

These and other objects of the present invention will become readily apparent from a consideration of the following specification and claims taken in conjunction with the accompanying drawings.

BRIEF DESCRIPTION OF THE DRAWINGS

FIG. 7 is a plan view of a foldable embodiment of the livestock confinement pasture machine in the collapsed position.

FIG. 9 is a diagrammatic plan view of a second embodiment of the livestock confinement pasture machine of FIG. 1;

FIG. 10 is a view in side elevation of the front drive wheel for the livestock confinement pasture machine of FIG. 9; and FIG. 11 is a plan view of the front drive wheel of FIG. 10.

BEST MODE FOR CARRYING OUT THE INVENTION

Figure 1:
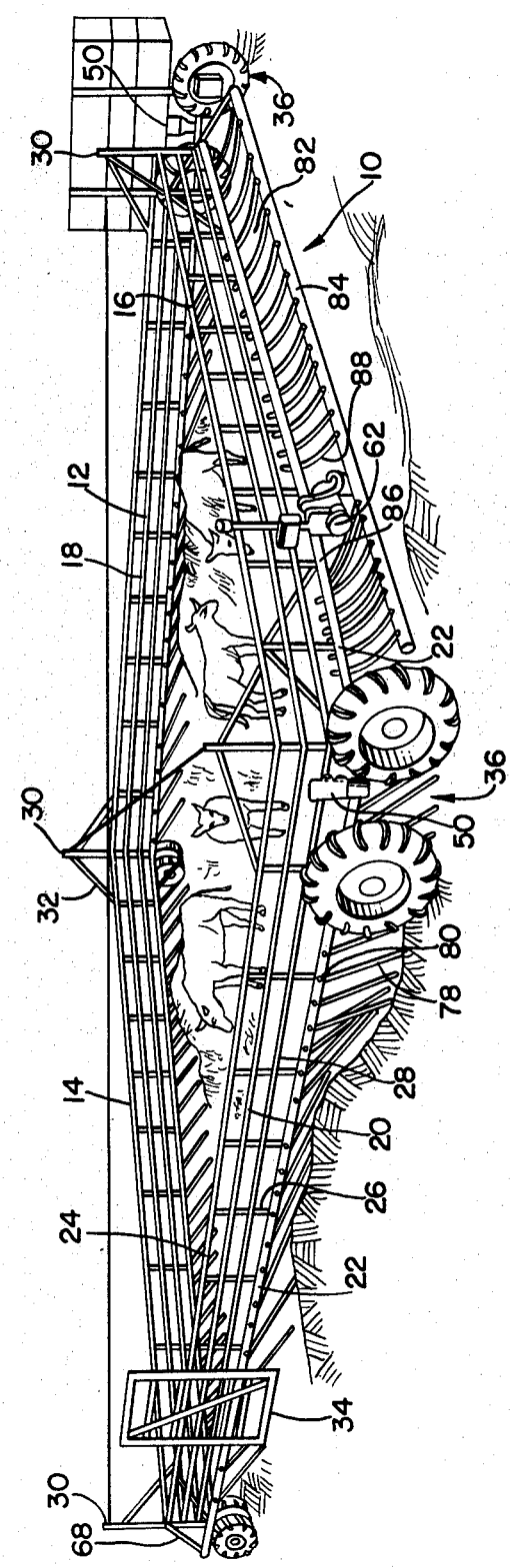
FIG. 1 is a perspective view of the livestock confinement pasture machine of the present invention.

Referring now to FIG. 1, the livestock confinement pasture machine of the present invention indicated generally at 10 includes a confinement unit or corral 12 formed from suitable interconnected fencing sections to define an enclosed area. The corral 12 may be formed by any suitable fencing structure, but preferably is formed by structural steel tubing interconnected to define a square or rectangular fenced area. In FIG. 1, the corral 12 is formed by a front fencing section 14 spaced from a rear fencing section 16 by side fencing sections 18 and 20. Each of these fencing sections includes a horizontally extending bottom rail 22 spaced from a horizontally extending top rail 24 by a plurality of spaced vertically extending intermediate rails 26. Secured to these vertically extending intermediate rails are one or more horizontally extending intermediate rails 28. The rails 22, 24, 26 and 28 may be interconnected by welding or other suitable known means to provide a rigid fencing section, and the fencing sections 14, 16, 18 and 20 are joined together at the adjacent corners thereof, to form an enclosure. At each corner of the corral 12, a vertically extending corner post 30 is provided to extend above the top rail 24. This post 30 is suitably braced by bracing sections 32 which extend from adjacent fencing sections to the post.

One or more access closures 34 may be pivotally secured to a fencing section of the corral 12 to provide a gate to facilitate the entry or exit of livestock.

Figure 2:
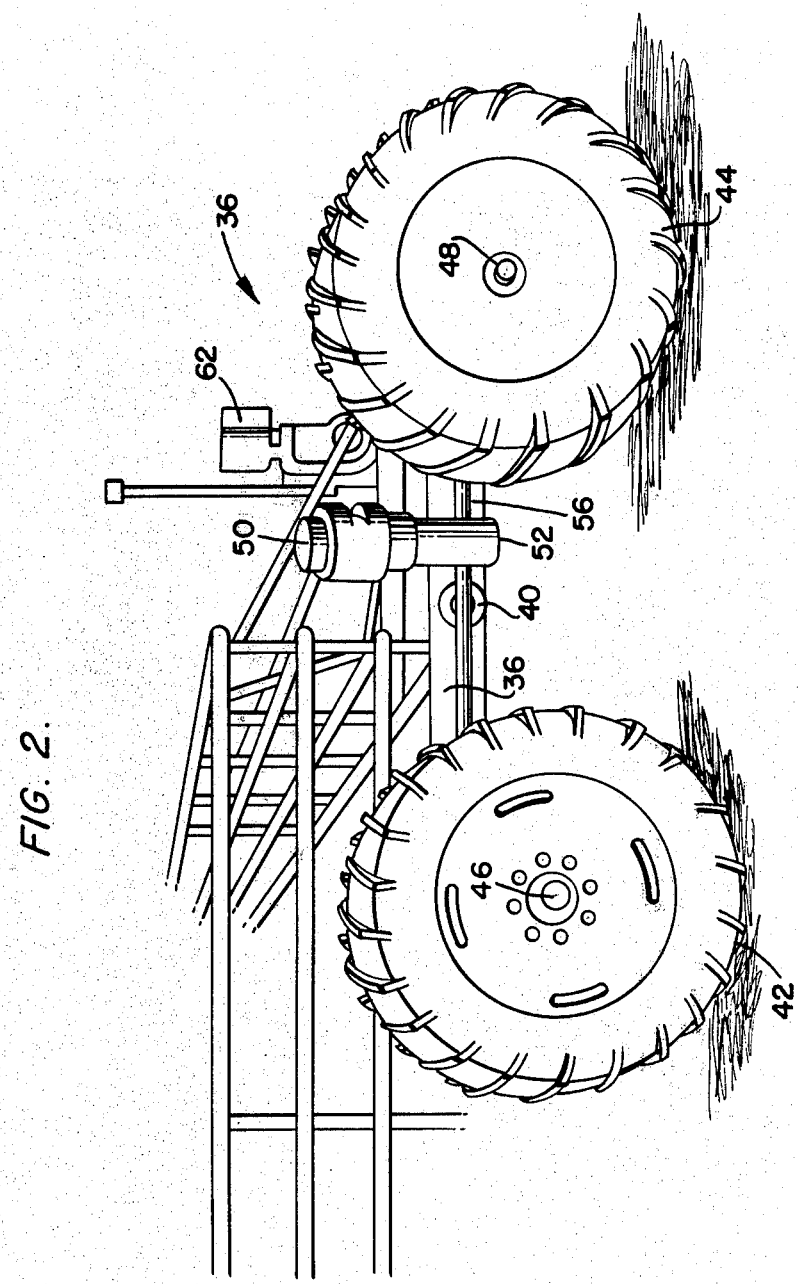
FIG. 2 is a view in side elevation of the drive unit for the livestock confinement pasture machine of FIG. 1.

The corral 12 is propelled by means of tandem drive wheel sets 36 mounted at each rear corner thereof. With reference to FIG. 2, it will be noted that each tandem drive wheel set 36 includes a support member 38 which is mounted on the rear corner of the corral 12 by means of a projecting stub axle 40. This stub axle is keyed to the support member 38 to permit limited pivotal movement of the support member about the stub axle.

Drive wheels 42 and 44 are mounted for rotation at either end of the support 38 by means of axles 46 and 48 respectively. The axles 46 and 48 are secured to the support 38 and constitute stub axles upon which the drive wheels are rotatably mounted.

The drive wheels 42 and 44 are driven in tandem by means of an electric motor 50 which drives a gear box 52 mounted, with the motor, on the support 38. The gear box 52 may include any known gear box capable of transmitting the drive power from the electric motor 50 simultaneously to the drive wheels 42 and 44. For example, this gear box may constitute a Durst Model A13513400, 60:1 ratio.

The output from the gear box 52 is transmitted via worm gear drives 54 and 56 to gear boxes 58 and 60 (FIG. 3) which are suitably connected to drive the wheels 42 and 44. The gear boxes 58 and 60 may constitute, for example, Durst Model A1395020, 60:1 ratio gear boxes, or gear boxes of similar construction adaptable to drive the drive wheels.

The tandem wheel drive units 36 at each side of the corral 12 are identical in construction, and each includes an electric drive motor 50. These electric drive motors are powered by a motor generator set 62 which is mounted upon the rear section 16 of the corral 12 and which is electrically connected by electrical conductors to the electric motors 50. This motor generator set is of any suitable commercially known type, such as an Onan Model motor generator set. The motor generator set is operated by a time clock that can be adjusted to start and stop the motor generator set and thus hold the livestock pasture confinement machine to a time schedule that will allow the livestock producer to set the precise manner of machine movement across the ground. The time clock will control the livestock feed consumption and also the livestock movement by controlling the operating time of the motor generator set.

The front corners of the corral 12 are supported by dual dolly wheel units illustrated generally at 64. Each of these dual dolly wheel units is pivotally secured at 66 to a support 68 projecting forwardly from a corner of the front section 14. The dolly wheel unit includes a support bar 70 having one end pivoted at 66 to the support 68 and an axle 72 for wheels 74 and 76 secured to the other end thereof.

The dual dolly wheel units 64 and the tandem drive wheel units 36 support the corral 12 at an appreciable distance above the ground. Consequently, to insure that smaller animals such as hogs and sheep cannot escape under the corral as it moves across rough terrain, drag bars 78 are pivoted at 80 to the lower rails 22 of the fencing sections 14, 18, and 20. These drag bars are closely spaced and pivot about the hinge points 80 to follow the contour of the ground and prevent animals from escaping under the bars 22.

In the rear of the livestock confinement pasture machine 10, a push bar assembly 82 is provided to follow the contour of the ground. This push bar assembly includes a horizontally disposed bar 84 which is connected to the lower rail 22 of the rear fencing section by means of braces 86. The bar constitutes part of an assembly for supporting a plurality of push bars 88, and the structure of this assembly may best be understood by reference to FIG. 4.

Figure 4:
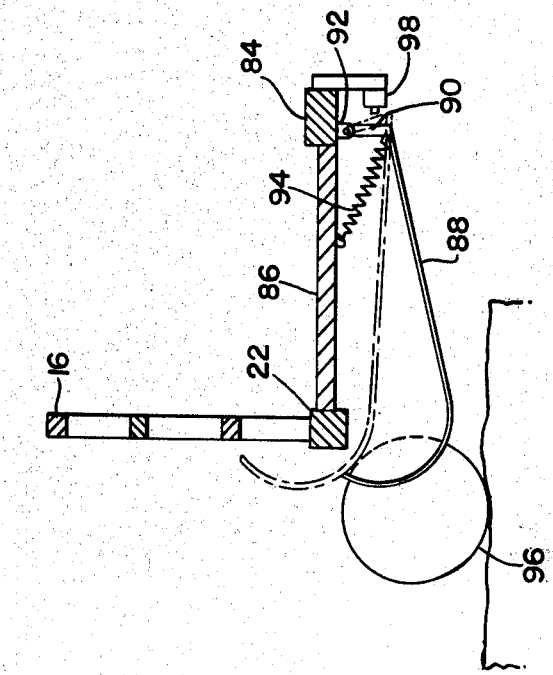
FIG. 4 is a sectional view of a pusher bar assembly for the livestock confinement pasture machine of FIG. 1.

It will be noted from FIG. 4 that the bar 84 has a hinged support bar 90 depending from the lower side thereof which extends substantially parallel thereto. The support bar 90 is hinged to the bar 84 by a hinge 92, and is spring biased to the vertical position shown in FIG. 4 by springs 94 extending between the lower end of the support bar and the supports 86. Attached to the lower edge of the support bar 90 are the forwardly extending, curved closely spaced push bars 88, and these push bars are pivoted to the support bar so that they may ride up over small objects and irregularities in the terrain traversed by the livestock confinement pasture machine. However, when a push bar encounters a large object, such as that illustrated at 96, it is impossible for the bar to ride over the object, and consequently the bar will exert rearward pressure on the support bar 90 causing the support bar to pivot rearwardly against the bias of the spring 94. As the bar 90 moves rearwardly, it contacts a micro switch 98 which breaks the circuit to the electric drive motors 50 for the livestock confinement pasture machine.

Figure 3:
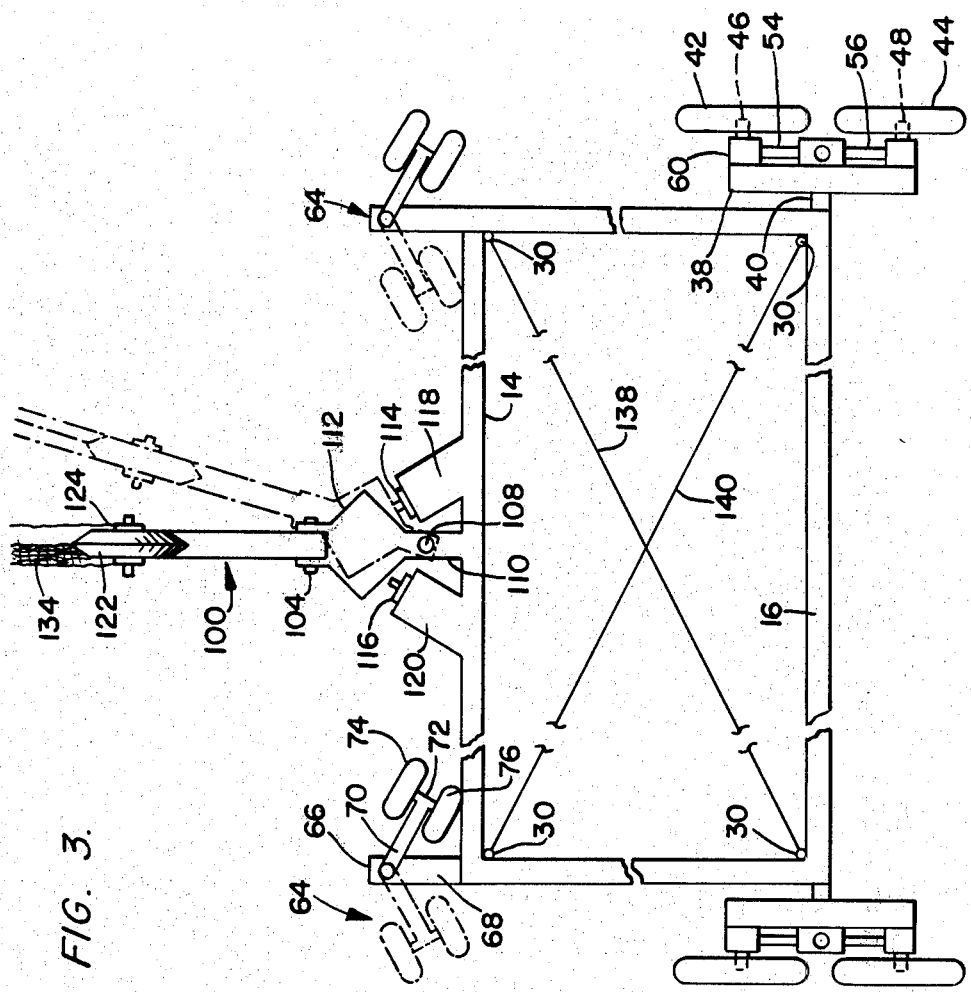
FIG. 3 is a plan view of the livestock confinement pasture machine of FIG. 1.
Figures 5, 8:
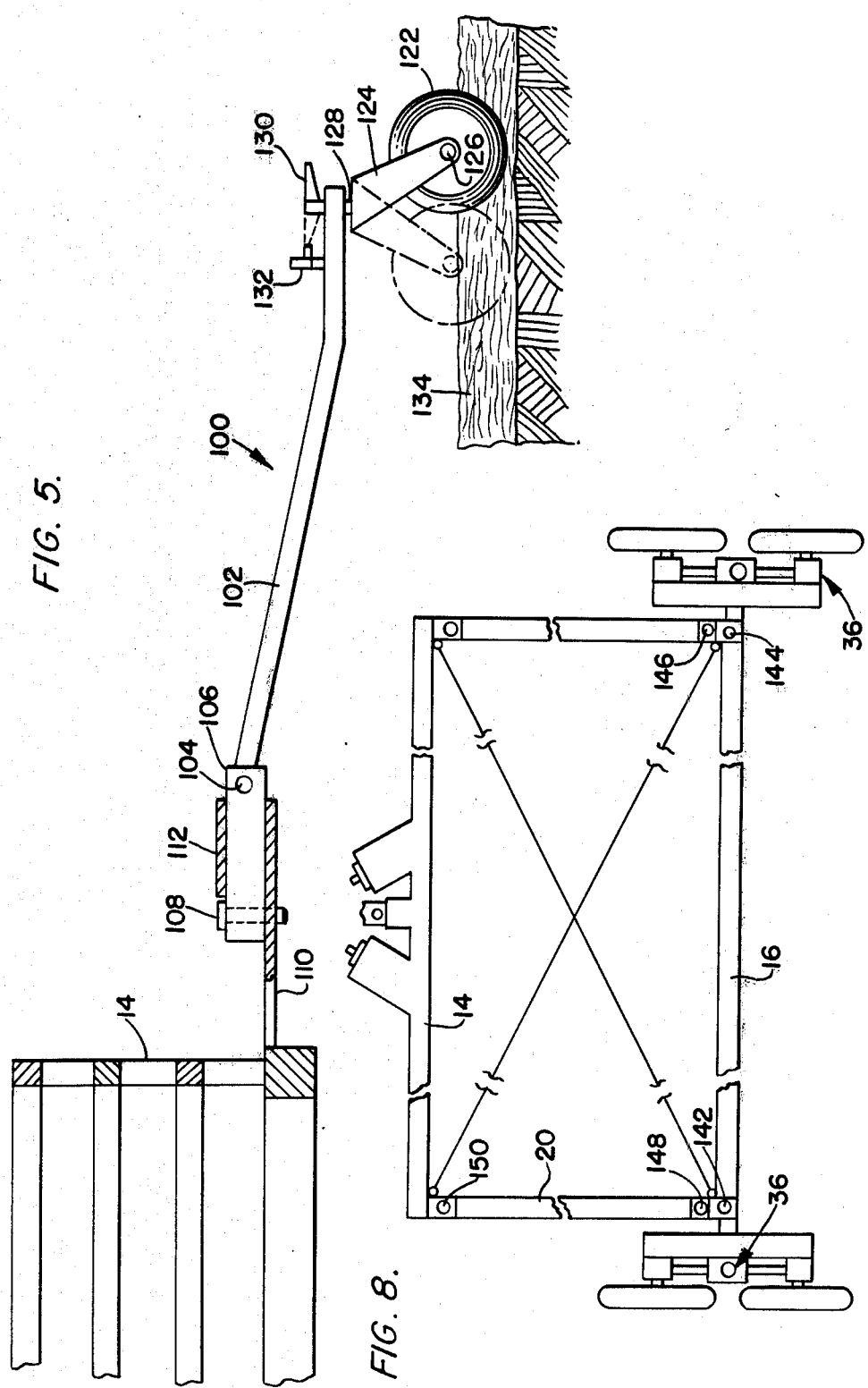
FIG. 5 is a view in side elevation of the steering assembly for the livestock confinement pasture machine of FIG. 1.
FIG. 8 is a plan view of the embodiment of FIG. 7 in the erected position.

The livestock pasture confinement machine 10 moves in a direction determined by a steering assembly 100 (FIGS. 3 and 5). This steering assembly includes an elongated arm 102 which is pivotally attached by means of a horizontally extending pivot pin 104 to a clevis 106. The clevis 106 is pivoted by means of a vertical pin 108 on a rigid tongue 110 projecting from the bottom rail 22 on the front section 14. Thus the arm 102 is permitted to pivot both vertically and horizontally.

The clevis 106 is provided with a square body portion 112 which is designed to cooperate with a right motor control switch 114 and a left motor control switch 116. These switches are positioned adjacent the square portion 112 by supports 118 and 120 projecting forwardly from the lower rail 22 of the front section 14.

Pivotally mounted at the forward end of the arm 102 is a guide wheel 122. This guide wheel is supported for rotation relative to a U-shaped fork member 124 by means of an axle 126, and the fork member 124 is pivoted relative to the arm 102 by means of a vertically extending pivot pin 128. A striker arm 130 is secured to the upper end of the pivot pin 128 and extends parallel to the forward direction of travel of the wheel 122. When the wheel 122 swivels substantially 180° to the normal forward direction of travel, as indicated in dotted lines in FIG. 5, the striker arm 130 activates a microswitch 132 which is mounted upon the arm 102. This microswitch will then operate to terminate the operation of the electrical motors 50.

Normally, the guide wheel 122 is inserted within a furrow or ditch 134 which has been previously formed in the ground to be traversed by the livestock confinement pasture machine 10. This furrow is laid out in a predetermined course to be followed by the livestock pasture machine. As the guide wheel 122 moves along the furrow, a small change of direction to either the right or the left will be handled by the dolly wheel units 64. However, if a relatively substantial change of direction is made, the limit switches 114 or 116 will be contacted by the square portion 112 of the clevis. For example, if a radical change to the right is made as illustrated in FIG. 3, square portion 112 will contact the limit switch 114 causing the right motor 50 to be deenergized. This terminates power to the drive wheels 42 and 44 on the rear right side of the confinement pasture machine while the electric motor 50 on the left side causes a left drive wheels 42 and 44 to proceed until the left side of the machine progresses enough to release the switch 114. A similar operation occurs in reverse when the switch 116 is contacted by the square portion 112.

Should the guide wheel 122 jump from the furrow 134, the tendency of the guide wheel will be to swivel to the rear dotted line position of FIG. 5, thus causing the striker arm 130 to contact the switch 132 and terminate the power to both drive motors 50. It is obvious that many different methods may be employed to control the arm 102 and the progress of the guide wheel 122 other than the use of a furrow 134. For example, a guide wire may be attached to the fork 124 so that the guide wheel 122 will follow a course set by the guide wire, or a servo type steering motor might be connected to control the direction of movement of the swivel 128. This servo motor system would then be sensitive to control by any one of a number of known direction controllers, such as a photo electric direction control system, a power line direction control system, or any other known systems for controlling the direction of a large machine by sensing some preinstalled unit along a predetermined course to control servo motors for steering.

Figure 6:
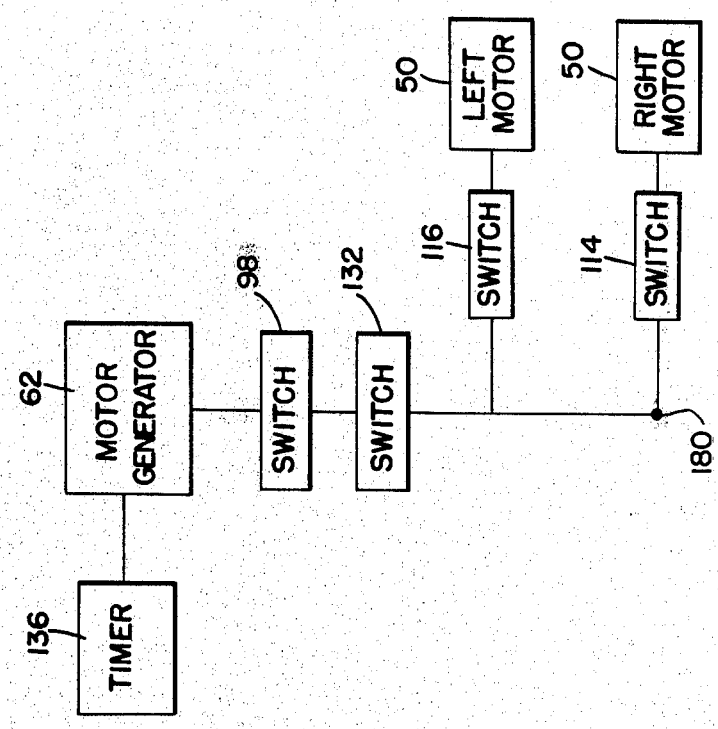
FIG. 6 is a block diagram of the electrical power circuit for the livestock confinement pasture machine of FIG. 1.

The electrical control system for the livestock confinement and pasture machine 10 of the present invention will best be understood with reference to FIG. 6 wherein it will be noted that the motor generator 62 is connected to supply power to the left and right electric motors 50. As previously indicated, a suitable adjustable timer 136 determines the time sequence during which the motor generator 62 will operate and the periods between these operable periods when the motor generator will be out of operation. As an alternative, of course, the motor generator 62 could constantly operate, and a known timer switch system would then be placed at the output of the motor generator between the motor generator and the switch 98. This timer switch system would then open the circuit between the motor generator and the left and right motors 50 for predetermined periods of time and then close the circuit for predetermined periods of time.

The electrical output of the motor generator is fed through the series connected switches 98 and 132 which constitute normally closed switches. Thus, when the switch 98 is contacted by the bar 90 or the switch 132 is contacted by the striker arm 130, these respective switches are opened for the period of contact to break the output circuit from the motor generator 62 and terminate the provision of power to the motors 50. The output from the series switches 98 and 132 is then directed through the right motor switch 114 to the right motor 50 and the left motor switch 116 to the left motor 50. The switches 114 and 116 are also normally closed switches, which, when contacted by the square portion 112 of the clevis are opened to break the circuit to the respective motor connected thereto.

Once the confinement pasture machine 10 is assembled, the corral 12 may be braced by means of cables 138 and 140 which extend between posts 30 at opposite corners of the corral 12. These cables become particularly important when a collapsible livestock confinement pasture machine of the type illustrated in FIGS. 7 and 8 is used. Referring to these Figures, it will be noted that pivot posts 142 and 144 are positioned at the juncture between the rear wall 16 and the side walls 18 and 20. These pivot posts permit the drive wheel assemblies 36 to be pivoted against the rear wall 16. Second rear pivot posts 146 and 148 spaced from the posts 142 and 144 and front pivot posts 150 and 152 are then provided to permit the side walls 18 and 20 to be pivoted to the right in FIG. 8 until the side wall 20 is parallel and adjacent to the rear wall 16. This enables the livestock confinement pasture machine to be folded relatively flat as illustrated in FIG. 7. The pivot posts 142, 144, 146, 148, 150 and 152 may be any suitable pivot posts which may be locked into position when the livestock confinement pasture machine is expanded and to be subsequently unlocked and pivoted into the storage position of FIG. 7.

When the livestock confinement pasture machine is to be used in areas where extremely adverse terrain conditions exist, such as in marsh land or rocky terrain, it is often advantageous to add an additional drive wheel assembly to the machine. With reference to FIGS. 9 and 10, it will be noted that this drive wheel assembly 154 is mounted upon a cross support 156 which extends between the side fencing sections 18 and 20 and which is spaced behind the front fencing section 14. The drive wheel assembly 154 is mounted in line with the center of the front fencing section 14 and includes a support 158 which is secured to the cross support 156 and which extends forwardly therefrom. A "U" shaped wheel fork unit 160 is pivotally mounted to the support 158 to pivot on a shaft 162 extending through the support. An elongated handle 172 is mounted on the upper end of the shaft 162 and is secured to control the pivotal movement of the shaft.

The wheel fork unit includes support arms 164 which extend downwardly on either side of a wheel 166 and engage a stub shaft upon which the wheel is mounted. An electric motor 168 is mounted on the wheel fork unit 160 and operates to drive the wheel 166 through a gear box 170 in the same manner employed for driving the drive wheels 42 and 44. However, the motor 168 directly drives the gear box 170 connected to the stub axle of the wheel 166.

The handle 172 operates to turn the shaft 162 and the wheel fork unit 160 which is secured to the shaft. This turning movement is controlled by means of the cables 138 and 140. The ends of each of these cables are attached to the posts 30 at the ends of the rear fencing section 16 of the corral. Each cable then extends to the opposite front corner of the corral where it passes over a cable sheave 174 mounted at the top of each front post 30. The cables then extend back to the end of the handle 172 where they are respectively secured to eye bolts 176 and 178 on opposite sides of the handle.

The drive wheel assembly 154 operates in the same manner as a conventional tricycle front wheel. As the livestock confinement pasture machine is driven into a turn by one of the drive wheel sets 36, the corral 12 will tend to move out of the normal square or rectangular configuration causing one of the cables 138 or 140 to become taut while the other cable becomes slack. The handle 172 will be drawn to one side by the taut cable, causing the wheel assembly 154 to turn. For example, if the right drive wheel set 36 stops and the left drive wheel set turns to drive the confinement pasture machine 10 to the right, the fencing section 20 will tend to be driven forward beyond the fencing section 18. This causes the cable 140 to become taut drawing the handle 172 to the left in FIG. 9 and thereby turning the wheel 166 to the right. The reverse operation occurs when the left drive wheel set 36 stops and the right drive wheel set turns to cause the cable 138 to become taut.

The motor 168 may be directly connected to point 180 in the circuit of FIG. 6 to receive power from the motor generator 62.

INDUSTRIAL APPLICABILITY

The livestock pasture confinement machine 10 of the present invention may be moved into a pasture area in the collapsed position of FIG. 7 and subsequently expanded into the operating configurations of FIGS. 1 and 3. The corral 12 is then filled with livestock and the guide wheel 122 is positioned within a sterrage furrow 134. The timer 136 is then set to determine the period of time during which the motor generator 62 operates and the timed intervals of nonoperation, and the motor generator is then started. The motors 50 will now power the machine during the periods of motor generator operation, but should a large obstruction be encountered causing operation of the switch 98, or should the guide wheel 122 leave the guide furrow 134 causing operation of the switch 132, the motors will be deenergized. Also, should the guide arm 102 be subjected to sharp turns so that one of the limit switches 114 or 116 is activated, the associated motor 50 will be deenergized until the remaining motor operating through associated drive wheels 42 and 44 drives the livestock confinement pasture machine into a turn so that engagement with the limit switch ceases and both motors are again energized.

If the livestock pasture machine is used to confine small animals solid sheets of material or wire mesh may be bolted to the fencing sections forming the corral 12. This material will extend to ground level and will encompass the entire periphery of the corral.

I claim:

1. A livestock confinement pasture machine comprising confinement means for confining livestock within a defined area, said confinement means having a front end and a rear end, drive assembly means mounted upon said confinement means for moving said confinement means at a predetermined speed to control the grazing of livestock confined thereby, said drive assembly means including at least one drive wheel unit mounted on said confinement means, a motor connected for driving said drive wheel unit, and presettable automatic timing means for operating said motor for a time selected prior to starting said motor to move said confinement means during the time selected and to stop the movement of said confinement means when the time selected has elapsed, and steering means for controlling the direction of movement of said confinement means mounted upon said confinement means, said steering means operating to sense and follow a preformed direction control path for said livestock confingement pasture machine.

2. The livestock confinement pasture machine of claim 1, wherein said drive assembly means is mounted at the rear end of said confinement means, and which includes two spaced wheel assemblies mounted adjacent the front end of said confinement means, said spaced wheel assemblies each including a support wheel pivotally mounted on said confinement means.

3. The livestock confinement pasture machine of claim 2, wherein said steering means is mounted between said spaced wheel assemblies.

4. The livestock confinement pasture machine of claim 1, wherein said motor is an electric motor, said drive assembly means including a power source and limit switch means between said power source and said motor to control the energization of said motor.

5. The livestock confinement pasture machine of claim 1, wherein said confinement means includes four sides pivotally connected for movement between a collapsed and open position.

6. A livestock confinement pasture machine comprising confinement means for confining livestock within a defined area, said confinement means having a front end and a rear end, two spaced wheel assemblies mounted adjacent the front end of said confinement means, said spaced wheel assemblies each including a support wheel pivotally mounted on said confinement means, drive assembly means mounted at the rear end of said confinement means for moving said confinement means at a predetermined speed to control the grazing of livestock confined thereby, said drive assembly means including two drive wheel units mounted in spaced relationship adjacent the rear end of said confinement means, each said drive wheel unit including a motor connected to drive said drive wheel unit, and timing means for controlling the time of operation of said motor, and steering means mounted between said spaced wheel assemblies for controlling the direction of movement of said confinement means mounted upon said confinement means, said steering means operating to sense and follow a preformed direction control path for said livestock confinement pasture machine and including a guide arm pivotally mounted upon said confinement means for pivotal movement about a vertical axis, and limit means mounted on either side of said guide arm in spaced relation thereto, said limit means being positioned for individual actuation by said guide arm when said guide arm is pivoted beyond a limit point, each said limit means operating upon actuation by said guide arm to cause one of said motors to discontinue driving an associated drive unit.

7. A livestock confinement pasture machine comprising confinement means for confining livestock within a defined area, said confinement means having a front end and a rear end, drive assembly means mounted upon said confinement means for moving said confinement means at a predetermined speed to control the grazing of livestock confined thereby, said drive assembly means including first and second drive wheel units mounted in spaced relationship adjacent the rear end of said confinement means, each said drive wheel unit including at least one wheel and a motor connected to drive said wheel, and timing means for controlling the time of operation of said motor, and steering means for controlling the direction of movement of said confinement means mounted upon said confinement means, said steering means operating to sense and follow a preformed direction control path for said livestock confinement pasture machine and including limit means to discontinue operation of the motor for one drive wheel unit while continuing operation of the motor for the remaining drive wheel unit to aid in turning said confinement means.

8. A livestock confinement pasture machine comprising confinement means for confining livestock within a defined area, said confinement means having a front end and a rear end, drive assembly means mounted upon said confinement means for moving said confinement means at a predetermined speed to control the grazing of livestock confined thereby, said drive assembly means including at least one drive wheel unit mounted on said confinement means, a motor connected for driving said drive wheel unit, and timing means for controlling the time of operation of said motor, and steering means for controlling the direction of movement of said confinement means mounted upon said confinement means, said steering means operating to sense and follow a preformed direction control path for said livestock confinement pasture machine, and obstruction sensing means mounted on said confinement means, said obstruction sensing means operating in response to an obstruction too large to permit the passage of said confinement means to terminate the operation of the motor of said drive wheel unit.

9. A livestock confinement pasture machine comprising confinement means for confining livestock within a defined area, said confinement means having a front end and a rear end, drive assembly means mounted upon said confinement means for moving said confinement means at a predetermined speed to control the grazing of livestock confined thereby, said drive assembly means including at least one drive wheel unit mounted on said confinement means, a motor connected for driving said drive wheel unit, and timing means for controlling the time of operation of said motor, and steering means for controlling the direction of movement of said confinement means mounted upon said confinement means, said steering means operating to sense and follow a preformed direction control path for said livestock confinement pasture machine and including a guide arm pivotally mounted upon said confinement means for pivotal movement relative thereto, a guide wheel assembly pivotally mounted upon said guide arm in spaced relation to said confinement means, and limit means mounted upon said guide arm for activation by said guide wheel assembly when said guide wheel assembly pivots to a predetermined limit point, said limit means operating when activated to cause said motor to discontinue driving said drive unit.

10. A livestock confinement pasture machine comprising confinement means for confining livestock within a defined area, said confinement means having a front end and a rear end, drive assembly means mounted upon said confinement means for moving said confinement means at a predetermined speed to control the grazing of livestock confined thereby, said drive assembly means including first and second drive wheel units mounted in spaced relationship adjacent the rear end of said confinement means, each said drive wheel unit including an electric motor connected to drive said drive wheel unit, said drive assembly means further including a power source and limit switch means between said power source and said motor to control the energization of said motor, timing means for controlling the time of operation of said motor, and steering means for controlling the direction of movement of said confinement means mounted upon said confinement means, said steering means operating to sense and follow a preformed direction control path for said livestock confinement pasture machine, said limit switch means including a first normally closed limit switch connected between said power supply means and the electric motor for said first drive wheel unit and a second normally closed limit switch connected between said power supply means and the electric motor for said second drive wheel unit, said first and second limit switches being mounted in spaced relationship on the confinement means adjacent the front end thereof, said steering means including a guide arm pivotally mounted upon said confinement means between said first and second limit switches, said guide arm being positioned to contact one of said limit switches and open the limit switch when the guide arm is pivoted beyond a limit point in either direction.

* * * * *